No. 618,572. Patented Jan. 31, 1899.
E. D. HINKLEY.
BICYCLE BRAKE.
(Application filed Apr. 27, 1898.)
(No Model.)
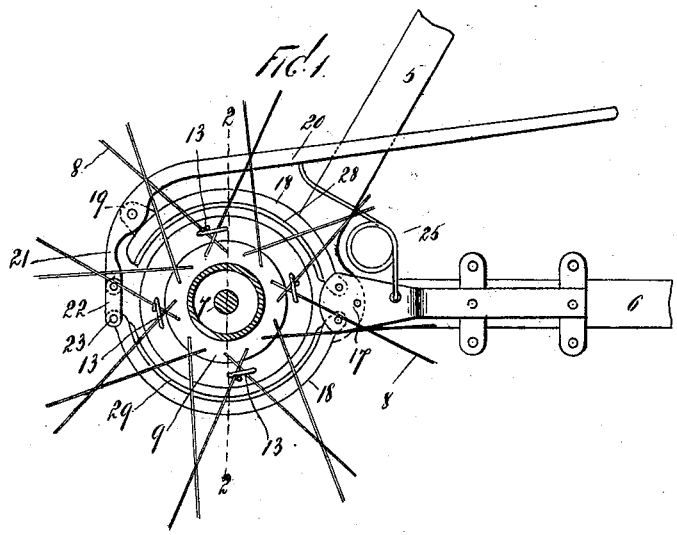
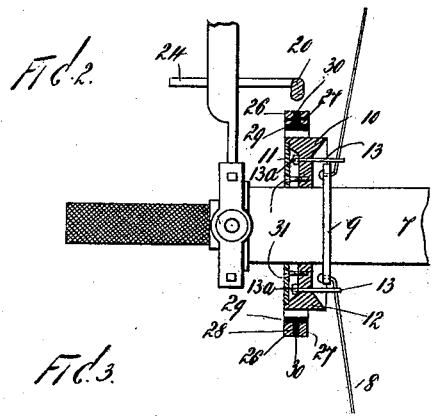
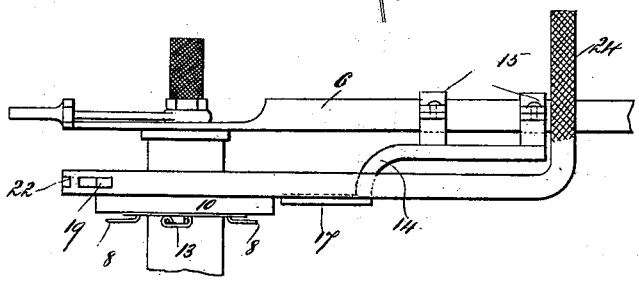
WITNESSES
John Buckler,
M. A. Knowles.
INVENTOR
Elza D. Hinkley
BY
Edgar Tate
ATTORNEYS
THE NORRIS PETERS CO., PHOTO-LITHO., WASHINGTON, D. C.

UNITED STATES PATENT OFFICE.

ELZA DELZERN HINKLEY, OF SING SING, NEW YORK.

BICYCLE-BRAKE.

SPECIFICATION forming part of Letters Patent No. 618,572, dated January 31, 1899.

Application filed April 27 1898. Serial No. 678,970. (No model.)

*To all whom it may concern:*

Be it known that I, ELZA DELZERN HINKLEY, a citizen of the United States, residing at Sing Sing, in the county of Westchester and State of New York, have invented certain new and useful Improvements in Brakes for Bicycles, of which the following is a full and complete specification, such as will enable those skilled in the art to which it appertains to make and use the same.

This invention relates to brakes for bicycles and similar vehicles; and the object thereof is to provide an improved device of this class which is simple in construction and operation and which may be attached to bicycles or similar vehicles as usually constructed.

The invention is fully disclosed in the following specification, of which the accompanying drawings form a part, in which the separate parts of my improvement are designated by the same numerals of reference in each of the views, and in which—

Figure 1 is a sectional side view of that part of the bicycle or similar vehicle in which the drive-wheel is mounted; Fig. 2, a partial section on the line 2 2 of Fig. 1, and Fig. 3 is a plan view of that construction shown in Fig. 1.

In the drawings forming part of this specification I have shown at 5 one side of the fork of a bicycle or similar vehicle, which extends from the support of the axle of the drive-wheel upwardly and forwardly to the seat-support and at 6 one of the horizontal bottom rods of the frame, and I have also shown at 7 the shaft or axle of the drive-wheel and at 8 a number of the spokes thereof, and in practice of my invention I provide a brake of the following construction: The hub or axle 7 of the drive-wheel is provided at each side with the usual annular flanges 9 with which the spokes 8 are connected, and mounted on said axle and inclosing one of said flanges is a brake-hub 10, consisting of two separate annular parts 11 and 12, and said hub is placed outside of the rim 9, and the inner part 10 thereof is connected with the spokes 8 of the wheel by threaded wires or rods 13, which are passed through the part 12 of the hub 10 from the outside, and the inner ends of which are twisted or folded around two of said spokes where they cross, as shown in Fig. 1, and the outer ends thereof are provided with nuts, and the hub 10 is thus secured to the drive-wheel and revolves therewith, as will be readily understood. The outer part 12 of the hub is thicker than the inner part, and my improved brake bears on the perimeter thereof, and the separate parts of said hub are preferably composed of two pieces, the ends of which overlap so as to more easily secure the same to the shaft or axle of the drive-wheel. I also secure to one of the bottom rods 6 of the frame an annular arm 14, which is provided with clamps 15, by means of which connection with the rod 6 is made, and said arm is provided with a backwardly-directed extension 17, to which are pivoted two similar semicircular brake-shoes 18, and these brake-shoes 18 inclose the outer portion of the hub 10, and the upper brake-shoe is provided with a lug 19, with which is pivotally connected a lever 20, which is provided with a backwardly and downwardly curved extension 21, which is pivotally connected with a link 22, which is pivotally connected with the outer end of the lower brake-shoe 18 at 23, and the lever 20 projects forwardly and is provided with a transverse arm 24, which extends transversely of the frame of the bicycle, as shown in Fig. 3, and said lever is connected with the backwardly-directed extension 17 of the arm 14 by an expansive spring 25.

The brake-shoes 18 are each composed of two separate parts 26 and 27, which are connected by pins or bolts 28, and the inner sides thereof are provided with bearings 29, composed of rubber, leather, or any suitable material, and these bearings are provided centrally with outwardly-directed flanges 30, which fit between the separate parts 26 and 27 and which are held in position by the pins or bolts 28, and the operation will be readily understood from the foregoing description when taken in connection with the accompanying drawings and the following statement thereof.

In the normal position of the parts the brake-shoes 18 are held out of contact with the brake-hub 10 by the expansive spring 25, and the arm 24 of the lever 20 may be easily reached by the foot of the rider, and whenever it is necessary to apply the brake the lever 20 is depressed, and this operation forces the brake-shoes 18 into contact with the hub 10, as will be readily understood, and when pressure on the lever 20 is removed the spring 25 will operate to remove the brake-shoes from the perimeter of the brake-hub.

The part 11 of the brake-hub 10 is simply a disk secured to the upper side thereof by screws 31 or in any desired manner and said disk serves only to cover the heads of the fastening device 13 and to render the outer side of said hub uniform and regular.

My improved brake is simple in construction and operation and perfectly adapted to accomplish the result for which it is intended, and it will be apparent that changes in and modifications of the construction described may be made without departing from the spirit of my invention or sacrificing its advantages.

Having fully described my invention, I claim as new and desire to secure by Letters Patent—

A bicycle or similar vehicle provided with a brake consisting of a brake-hub mounted on the hub of the drive-wheel, a support connected with one side of the frame of the vehicle, two segmental brake-shoes pivotally connected with said support and inclosing the upper and lower sides of said hub, a link pivotally connected with the free end of the lower brake-shoe, and a lever pivotally connected with said link, and with the upper side of the upper brake-shoe, said lever being projected forwardly and adapted to be operated by the foot, and a suitably-secured spring operating to support said lever, substantially as shown and described.

In testimony that I claim the foregoing as my invention I have signed my name, in presence of the subscribing witnesses, this 19th day of April, 1898.

ELZA DELZERN HINKLEY.

Witnesses:
REUBEN ADAMS,
THOMAS J. MCGOUGH.